United States Patent
Malchow et al.

[11] Patent Number: 6,076,930
[45] Date of Patent: Jun. 20, 2000

[54] PROCESS FOR FITTING A CONTACT LENS, AND MEASURING LENS FOR PERFORMING THE PROCESS

[75] Inventors: Volker Malchow, Kiel; Eckhard Rothe; Klaus Grimmenstein, both of Schonkirchen, all of Germany

[73] Assignee: Carl-Zeiss-Stiftung, Germany

[21] Appl. No.: 09/055,009

[22] Filed: Apr. 3, 1998

[30] Foreign Application Priority Data

Jun. 25, 1997 [DE] Germany ............................ 197 26 888

[51] Int. Cl.$^7$ .................................................. A61B 3/00
[52] U.S. Cl. .............................................................. 351/247
[58] Field of Search ..................................... 351/205, 206, 351/207, 209, 211, 212, 246, 247, 161, 177

[56] References Cited

U.S. PATENT DOCUMENTS

| | | |
|---|---|---|
| 4,268,133 | 5/1981 | Fischer et al. . |
| 4,869,587 | 9/1989 | Breger ...................................... 351/161 |
| 5,873,832 | 2/1999 | Maloney et al. ......................... 351/207 |

FOREIGN PATENT DOCUMENTS

| | | | |
|---|---|---|---|
| 0 346 032 | 12/1989 | European Pat. Off. .......... | G02C 7/04 |
| 0 452 549 | 10/1991 | European Pat. Off. .......... | G02C 7/04 |
| WO 94/17435 | 8/1994 | WIPO .............................. | G02C 7/04 |
| WO 95/25981 | 9/1995 | WIPO .............................. | G02C 7/04 |

*Primary Examiner*—George Manuel

[57] ABSTRACT

In a process for fitting a contact lens to a human eye, the geometry of the eyeball and the back surface geometry of the lens, and the required optical corrections for the distant and near vision of the eye to be corrected are determined. The measurement for fitting the contact lens takes place with a measuring lens that enables determination of relative pupil motion with respect to a reference system on or near the eye on changing from far vision to near vision. The measuring lens to be used for this measurement process has a substantially spherical lens body that has a substantially convex outer surface and a substantially concave inner surface. This measuring lens preferably serves for fitting multifocal contact lenses. To facilitate the measuring process, arrangements for determining the relative movement of a human pupil with respect to the surface of the measuring lens is provided on the measuring lens.

23 Claims, 1 Drawing Sheet

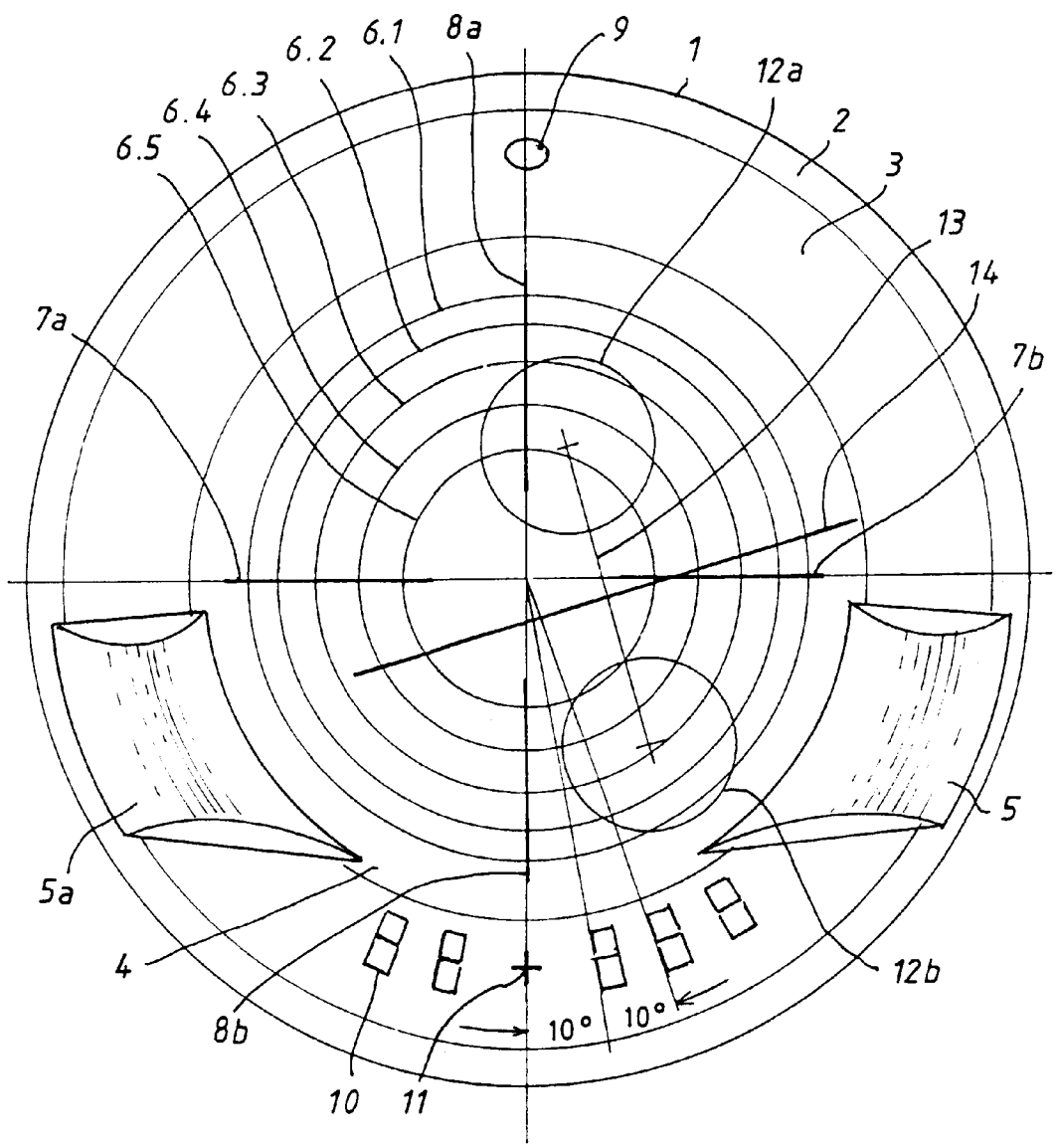

PROCESS FOR FITTING A CONTACT LENS, AND MEASURING LENS FOR PERFORMING THE PROCESS

BACKGROUND OF THE INVENTION

1. Field of the Invention

This invention relates to a process for fitting a multifocal contact lens to a human eye, and more particularly, to a process wherein the surface geometry of the eyeball for the back surface geometry of the lens, and the required optical corrections for the distant and near vision of the eye to be corrected are determined. The invention also relates to a measuring lens for performing this fitting process.

2. Discussion of Relevant Art

Presently known processes for fitting contact lenses, in particular multifocal contact lenses, are limited to determining the geometry of the eyeball for the back surface geometry of the required contact lens and the required optical corrections for the far and near vision of the eye to be corrected.

A disadvantage of the classical fitting process is that the geometry of the eye (in particular, the position of the eyelids in the opened state) and the movement of the eyeball with the pupil during the transition from far to near vision are not checked during the data determination.

SUMMARY OF THE INVENTION

The object of the invention is to develop a fitting process that makes possible a more certain fitting of the contact lens, for the use of contact lenses that during use have to have a stable position on the contact lens wearer's eye.

This object is attained by performing a fitting measurement of the contact lens to be fitted with an arrangement for determining movement of a pupil relative to a reference system on or near the eye when changing near vision to far vision. The measuring lens for attaining this object has a substantially spherical lens body with a substantially convex outer surface and a substantially concave inner surface and an arrangement for determining movement of a human pupil relative to a surface of the measuring lens.

The process according to the invention for fitting a contact lens to a human eye, wherein the geometry of the eyeball for the back surface geometry of the lens, and the required optical corrections for the distant and near vision of the eye to be corrected, are determined, is preferably used for fitting a positionally stabilized multifocal contact lens.

Here at least one additional fitting measurement takes place by means to determine the relative movement of the pupil of the eye concerned, on which the later contact lens is to be placed, in relation to a reference system on or near the eye. The reference system can, without limitation, be the lower lid of the eye, or another salient feature near the eye, or placed on the eye. When this data is obtained, the course of the visual zones on the position-stabilized contact lens can be individually, reliably determined for the respective contact lens wearer.

In particular, the reference system can also be provided by a measuring lens that is set on the eye being measured. The movement of the pupil relative to the measuring lens, or to the surface of the measuring lens, may be sensed to determine the relative movement of the pupil of the eye being measured, on which the contact lens will later be placed.

These means for determining the relative movement of the pupil of the eye being measured with respect to the surface of the measuring lens can be provided on the measuring lens, such that particulars corresponding to the fitting are made known to the later wearer of the contact lens, e.g. by color impressions.

These means for determining the relative movement of the pupil of the eye being measured with respect to the surface of the measuring lens can also be provided on the measuring lens, so that the operator can observe the corresponding eye with suitable observation equipment, preferably a slit lamp microscope.

A recording device, preferably with a photographic camera and/or a video camera, is preferably installed on the observation equipment, so that the data obtained can be recorded and, if so desired, displayed and/or stored.

It is advantageous if the pupil positions for near and far vision and/or (with advantage, simultaneously, as the case may be) the pupil diameter under certain lighting conditions can be determined with respect to the surface of the measuring lens. In order to exclude measurement errors, it is advantageous if these measurement data are determined electronically.

Furthermore, it is advantageous if the pupil positions for near and far vision and/or, as the case may be, simultaneously the pupil diameter, are used in relation to certain lighting conditions with respect to the surface of the measuring lens, to determine the size of the near and far portion of the measuring lens. Here also it is advantageous if this determination takes place electronically, in order to exclude measurement errors.

Moreover, it is advantageous if the pupil positions for near and far vision and/or, as the case may be, simultaneously, the pupil diameter under certain lighting conditions, are used with respect to the surface of the measuring lens, for determining the course of the dividing line between the near and far portion. This determination should also take place electronically, for the reasons already stated.

The measurement lens according to the invention required for carrying out the fitting process according to the invention has a substantially spherical lens body that has a substantially convex outer surface and a substantially concave inner surface. The measuring lens then is preferably used to fit multifocal contact lenses. In order to more easily follow the position of the pupil relative to the measuring lens, means are provided on the measuring lens for determining the relative movement of a human pupil with respect to the surface of the measuring lens. These means can be visible with the naked eye either constantly or under given circumstances (e.g., fluorescence).

Here the means for determining the relative movement of a human pupil relative to the surface of the measuring lens is advantageously embodied as engravings on or near the measuring lens.

The means for determining the relative movement of a human pupil with respect to the surface of the measuring lens can also be embodied as color inlays in the material of the lens body of the measuring lens. The means for determining the relative movement of a human pupil with respect to the surface of the measuring lens can also be embodied as color overlays on the convex outer surface.

The use of concentric circles as the means for determining the relative movement of a human pupil with respect to the surface of the measuring lens is considered to be preferable.

The use of crosshairs, as is well known from the state of the art, particularly in telescopic sights, is also suitable as means for determining the movement of a human pupil with respect to the surface of the measuring lens. In this embodiment, the use of one or more crosshairs and of one or more (e.g., concentric) rings are not mutually exclusive. For determining large rotations (−90°, −180° or −270°), one or more strokes can be differently formed (e.g., have different lengths, be double strokes, etc.).

By using measuring rings in or on the measuring lens, it has been found to be advantageous if more than three rings are installed, which have midpoints in the optical central point, and which have a mutual spacing of between 0.5 mm and 2 mm.

If an index comprising numerals and/or letters and/or signs is applied to the measuring lens, these numerals and/or letters and/or signs can facilitate an angle determination, and indeed very easily when the angular distance between the numerals and/or letters and/or signs of the index is defined (i.e., established), so that an equally large spacing produces the least difficulty when fitting.

If the angular spacing between the numerals and/or letters and/or signs of the index is delimited, it should be in the angular range between 5° and 20°.

It is advantageous if a plus sign, adapted to the size of the indices, is arranged on the measuring lens, and if this plus sign is part of the index (which can be, for example, an identity number).

The measuring lens is to be a spherical concentric optics with a diameter of at least 5 mm, so that a more certain measurement can take place.

Advantageously, a position stabilizer is applied on or near the measuring lens, and holds the measuring lens in a stable position relative to the lower eyelid of the patient wearing the measuring lens. This facilitates the measuring process, since otherwise the measuring lens has to be constantly observed between measurement processes for determining pupil position during near vision and far vision.

BRIEF DESCRIPTION OF THE DRAWING

The invention will now be described, taken together with the drawing, in which:

FIG. 1 shows a measuring lens according to the invention, as required for carrying out the process according to the invention.

DETAILED DESCRIPTION OF PREFERRED EMBODIMENTS

The measuring lens (1) shown in FIG. 1 is a contact lens with position stabilization, to be placed on the eye.

This contact lens (1) has an edge region (2), a lens outer region (3) and an optical zone (4). Thickened regions (5, 5a) are arranged on the lens outer region (3), and provide for a position stabilization of the contact lens (1) when placed on the contact lens wearer's eye. Then the lower edges of the thickened regions (5, 5a) lie lightly at least in point form on the lower eyelid of the eye on which the multifocal contact lens is later to be worn.

This kind of position stabilization is described in detail in European Patent EP 0 452 549. All of the data given in EP 0 452 549 for the measuring lens (1) holds true for the measuring lens (1) that is described as a preferred embodiment of the present invention.

The contact lens (1) has five concentric rings (6.1, 6.2, 6.3, 6.4, 6.5) in the optical zone (4), and also horizontal (7a, 7b) and vertical (8a, 8b) markings in the form of straight lines.

Furthermore, a colored spot (9) is arranged in the upper region of the lens outer region (3). The upper region is that region that is above where a contact lens is normally effective. This spot (9) is to make sure that the contact lens (1) is set on the eye in the correct orientation.

Furthermore, the contact lens has identifying marks (10) and at least one other marking (11) (preferably in the lower region of the contact lens (1)) on the otherwise empty lens outer region (3). The marking (11) is situated on a vertical prolongation of the vertical marks (8a, 8b).

The pupil (12a, 12b) of the human eye in different positions (far and near vision positions) is also shown in FIG. 1. The pupil is in the position (12a) if the wearer of the measuring lens (1) looks into the distance. The pupil is in the position (12b) when the contact lens wearer looks at something near.

A straight connecting line (13) is drawn between the middle points of the pupils (12a, 12b). Also, a line (14) is drawn that is perpendicular to this straight connecting line (13). The point of intersection of the two lines (13, 14) is situated exactly in the middle distance between the two pupil positions (12a, 12b) for far and near vision.

The fitting lens is equipped with a spherical, concentric optical zone (3) of 9.5 mm diameter. Furthermore, the fitting lens has a position stabilization as described hereinabove.

The concentric rings (6.1, 6.2, 6.3, 6.4, 6.5) are embodied as engravings in the optical zone (4), and consist of five concentric rings (6.1, 6.2, 6.3, 6.4, 6.5) at spacings of 1 mm, beginning at a diameter of 3 mm in the preferred embodiment shown. Vertical and horizontal engravings (7a, 7b; 8a, 8b) divide the optical zone (4) of the measuring lens (1) into four quadrants.

The symbols of the engraving (10) (which can, e.g., be an identification number) are arranged at a fixed distance (of 10°) to each other, the plus sign (11) being situated exactly on an extension of the vertical mark.

A rotation of ±20° of the measuring lens (1) on the eye can thereby be determined. Using such measuring lenses (1), four to eight different lenses, which must have two different diameters, will be found sufficient to enable most eyes of contact lens wearers to be measured.

The principle of operation can be described as follows: When fitting a multifocal or a bifocal lens, it is necessary to determine the relative movement of the pupil of the eye.

This relative movement must be related to a reference system. When a reference to, e.g., the lower eyelid is possible, the use of a measuring lens (1) then facilitates the measurement considerably. The measuring lens (1) is held on the lower eyelid, guided in a known manner by the position stabilizer, and makes measurements possible depending upon visual movements.

The position of the fitting lens or measuring lens (1) relative to the pupil (12a, 12b) can be observed with an observation equipment (e.g., a slit lamp microscope). The measurement can also, if necessary, be additionally recorded using a recording device, e.g., a photographic camera or a video-camera.

In the fitting measurement, a measurement value determination takes place when the wearer is looking downward (as while reading). Also, a second measurement value determination is made with a relaxed gaze directed slightly upward (far vision).

The two respective pupil positions (12a, 12b) can then be determined in relation to the four quadrants of the optical zone (4) that are given by the vertical and horizontal markings (7a, 7b; 8a, 8b), and also by the concentric rings (6.1, 6.2, 6.3, 6.4, 6.5). The result of these measurements makes it possible to determine the magnitude of the near or far portion and the course of the dividing line between these visual regions. This evaluation or determination can also take place electronically with suitable image evaluation software, thus making it possible to avoid measurement errors by the operator.

The pupil (12a, 12b) does not move exactly vertically when changing the line of sight from far vision to near vision. However, the dividing line or transition line between near and far portions should be aligned perpendicular to the direction of movement in the multifocal or bifocal lens. This dividing or transition line will in the normal case deviate from the horizontal markings by an angle of up to ±30° (the angle of the dividing or transition lines will then mostly run substantially as mirror images with respect to the vertical).

In principle, all known contact lenses with and without position stabilization are suitable for use as measuring lenses, so long as means are provided on them for determining the movement of a human pupil relative to the surface of the measuring lens. Contact lenses without position stabilization are disadvantageous because the lens position can be corrected only with image evaluation software, according to the change of view from near to far vision or vice versa.

In principle, any position stabilization of a contact lens for use as a measuring lens is also suitable. However, when position of the measuring lens is not stabilized, a correction by an image evaluation software must take place after a visual change from near to far vision or vice versa.

As means for determining the movement of the pupil relative to a reference system on or near the eye on changing from far to near vision, all suitable means, according to the state of the art, can be used. Here also, the above data are to be considered only as examples.

What is claimed is:

1. A process for fitting a contact lens on a human eye, wherein geometry and required optical corrections for far and near vision of the eye to be corrected are determined, comprising, in connection with that determination:
   performing a fitting measurement for said contact lens to be fitted with an arrangement for determining relative movement of a pupil with respect to a reference system on or near the eye when changing from far vision to near vision.

2. The process for fitting a contact lens according to claim 1, further comprising:
   providing said reference system by setting a measuring lens on the eye on which said contact lens is to be placed, and
   determining relative movement of the pupil with respect to said measuring lens or a surface of said measuring lens.

3. The process for fitting a contact lens according to claim 2, further comprising observing relative movement of the pupil with respect to said measuring lens with observation equipment, and
   displaying or storing said observed movement.

4. The process for fitting a contact lens according to claim 3, wherein said observation equipment is selected from the group consisting of a split lamp microscope and a recording device.

5. The process for fitting a contact lens according to claim 4, wherein said recording device comprises a photographic camera or a video camera.

6. The process for fitting a contact lens according to claim 2, comprising measuring at least one of pupil positions and pupil diameter for near and far vision under certain lighting conditions with respect to said surface of said measuring lens.

7. The process for fitting a contact lens according to claim 6, comprising determining measurement data for at least one of pupil positions and pupil diameter electronically.

8. The process for fitting a contact lens according to claim 6, comprising using measurement data for at least one of pupil positions and pupil diameter for determining magnitudes of optical corrections necessary for near and far vision.

9. The process for fitting a contact lens according to claim 8, comprising determining said magnitudes for optical corrections electronically.

10. The process for fitting a contact lens according to claim 1, comprising:
    determining a course of a dividing line between near and far vision using at least one of pupil positions for near and far vision and pupil diameter under given lighting conditions with respect to said surface of said measuring lens.

11. The process for fitting a contact lens according to claim 10, comprising determining said course of said dividing line electronically.

12. A measuring lens for fitting a multi-focal contact lens, comprising:
    a substantially spherical lens body, having a substantially convex outer surface and a substantially concave inner surface, and
    an arrangement for determining relative movement of a human pupil with respect to a surface of said measuring lens.

13. The measuring lens according to claim 12, wherein said arrangement comprises engravings on or in said lens body.

14. The measuring lens according to claim 12, wherein said arrangement comprises color inlays in material of said lens body.

15. The measuring lens according to claim 12, wherein said arrangement comprises color overlays on said convex outer surface.

16. The measuring lens according to claim 12, wherein said arrangement comprises concentric circles.

17. The measuring lens according to claim 12, wherein said arrangement comprises a cross hair.

18. The measuring lens according to claim 12, wherein said arrangement comprises more than three rings on said measuring lens with a midpoint in an optical central point on said measuring lens, said rings being spaced from each other by between 0.5 mm. and 3 mm.

19. The measuring lens according to claim 12, further comprising a character sequence arranged on said measuring lens and comprising at least one of numerals, letters, and signs applied to said measuring lens, with a defined angular distance between said characters.

20. The measuring lens according to claim 19, wherein said angular distance between characters is in a range between 5 degrees and 20 degrees.

21. The measuring lens according to claim 19, further comprising a plus sign that is a part of said character sequence and is matched in size to said characters.

22. The measuring lens according to claim 12, wherein said measuring lens comprises spherical concentric optics with a diameter of at least 5 mm.

23. The measuring lens according to claim 12, further comprising a position stabilizer on or near said measuring lens for holding said measuring lens in a stable position relative to a lower eye lid of a wearer of said measuring lens.

* * * * *